(12) United States Patent
Miyamoto (10) Patent No.: US 11,052,543 B2
(45) Date of Patent: Jul. 6, 2021

(54) CONTROL DEVICE, ROBOT SYSTEM, AND ROBOT

(71) Applicant: Seiko Epson Corporation, Tokyo (JP)

(72) Inventor: Yoshito Miyamoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 159 days.

(21) Appl. No.: 16/585,198

(22) Filed: Sep. 27, 2019

(65) Prior Publication Data

US 2020/0101618 A1 Apr. 2, 2020

(30) Foreign Application Priority Data

Sep. 28, 2018 (JP) .............................. JP2018-184821

(51) Int. Cl.
*B25J 9/16* (2006.01)
*B25J 13/08* (2006.01)

(52) U.S. Cl.
CPC ........... *B25J 9/1697* (2013.01); *B25J 13/086* (2013.01)

(58) Field of Classification Search
USPC ................................................. 700/245–264
See application file for complete search history.

(56) References Cited

U.S. PATENT DOCUMENTS

| | | | |
|---|---|---|---|
| 4,766,322 A * | 8/1988 | Hashimoto | B25J 9/1015 250/559.33 |
| 5,495,090 A * | 2/1996 | Mukai | B23K 9/127 219/124.34 |
| 7,599,758 B2 * | 10/2009 | Reindle | A47L 9/2821 15/3 |
| 7,645,111 B2 * | 1/2010 | Mori | B65G 49/061 414/676 |
| 8,260,458 B2 * | 9/2012 | Kim | B25J 9/1612 700/245 |
| 9,990,540 B2 * | 6/2018 | Ariizumi | B25J 9/1697 |
| 10,434,655 B2 * | 10/2019 | Suzuki | B25J 9/1692 |
| 10,471,591 B1 * | 11/2019 | Hinkle | B25J 9/1697 |
| 10,478,970 B2 * | 11/2019 | Hannya | B25J 9/1694 |
| 10,730,181 B1 * | 8/2020 | Rajkumar | G06N 3/0454 |
| 2002/0087270 A1 * | 7/2002 | Kim | G06T 1/0014 701/301 |
| 2007/0192910 A1 * | 8/2007 | Vu | B25J 19/06 700/245 |

(Continued)

FOREIGN PATENT DOCUMENTS

JP H05-345160 A 12/1993

*Primary Examiner* — Jonathan L Sample
(74) *Attorney, Agent, or Firm* — Gang Yu (57) ABSTRACT

A control device includes a control section configured to control a motion of a robot arm using values detected by a plurality of distance sensors. The plurality of distance sensors include a first distance sensor and a second distance sensor disposed in a first direction orthogonal to the axial direction of a dispenser. The second distance sensor is disposed in a position further apart from the dispenser than the first distance sensor. The control section executes, on a robot, a first instruction for causing the robot to execute discharge of a discharge object by the dispenser when a distance acquired by the first distance sensor is a distance in a predetermined range and a distance acquired by the second distance sensor is a distance larger than the distance in the predetermined range.

10 Claims, 8 Drawing Sheets

(56) References Cited

U.S. PATENT DOCUMENTS

| | | | |
|---|---|---|---|
| 2008/0021597 A1* | 1/2008 | Merte | F16P 3/147 |
| | | | 700/255 |
| 2010/0049358 A1* | 2/2010 | Koch | G06F 17/00 |
| | | | 700/214 |
| 2011/0153082 A1* | 6/2011 | Franck | G01B 11/24 |
| | | | 700/259 |
| 2011/0320038 A1* | 12/2011 | Motoki | B25J 19/0008 |
| | | | 700/245 |
| 2012/0185094 A1* | 7/2012 | Rosenstein | G05D 1/0251 |
| | | | 700/259 |
| 2012/0185096 A1* | 7/2012 | Rosenstein | G05D 1/0274 |
| | | | 700/259 |
| 2013/0073086 A1* | 3/2013 | Motoyoshi | G05B 15/00 |
| | | | 700/258 |
| 2013/0325181 A1* | 12/2013 | Moore | B25J 13/08 |
| | | | 700/259 |
| 2017/0140539 A1* | 5/2017 | Wang | G06T 7/73 |
| 2017/0153713 A1* | 6/2017 | Niinuma | G09G 5/377 |
| 2017/0157783 A1* | 6/2017 | Ogawa | F16P 3/003 |
| 2017/0252921 A1* | 9/2017 | Hynna | A61B 17/00234 |
| 2017/0354518 A1* | 12/2017 | Park | B25J 13/089 |
| 2017/0356730 A1* | 12/2017 | Wang | B25J 9/1697 |
| 2018/0021954 A1* | 1/2018 | Fischer | B25J 13/089 |
| | | | 700/253 |
| 2018/0264357 A1* | 9/2018 | Dalton | A63F 13/24 |
| 2018/0264644 A1* | 9/2018 | Vance | B25J 9/1664 |
| 2018/0306587 A1* | 10/2018 | Holz | G01S 5/16 |
| 2018/0311814 A1* | 11/2018 | Kamisono | G05B 19/423 |
| 2019/0105779 A1* | 4/2019 | Einav | B25J 9/1697 |
| 2019/0196488 A1* | 6/2019 | Holmberg | G05D 1/0287 |
| 2020/0101605 A1* | 4/2020 | Miyamoto | B25J 13/089 |

\* cited by examiner

CONTROL DEVICE, ROBOT SYSTEM, AND ROBOT

The present application is based on, and claims priority from, JP Application Serial Number 2018-184821, filed Sep. 28, 2018, the disclosure of which is hereby incorporated by reference herein in its entirety.

BACKGROUND

1. Technical Field

The present disclosure relates to a control device, a robot system, and a robot.

2. Related Art

There is known an adhesive applying device including a nozzle and an application syringe that applies an adhesive to a glass substrate from the nozzle, the adhesive applying device measuring the height of the glass substrate with a laser sensor and bringing the nozzle into contact with a load cell provided at a predetermined height to set the height of the nozzle (e.g., JP A-5-345160 (Patent Literature 1)). The adhesive applying device adjusts the position of the nozzle according to the set height to set a gap between the glass substrate and the nozzle to a fixed value.

When the nozzle is moved along a path at a fixed distance from an edge of an application object to apply the adhesive to the edge of the application object using related art, apart where height from the application object is measured deviates from the edge of the application object and an application failure occurs if there is fluctuation in the shape of the application object.

SUMMARY

According to an aspect of the present disclosure, there is provided a control device that controls a robot including a robot arm, a dispenser provided at a distal end of the robot arm and configured to discharge a discharge object, and a plurality of distance sensors configured to detect distances to a target in a direction in which the discharge object is discharged. The control device includes a control section configured to control a motion of the robot arm using values detected by the distance sensors. The plurality of distance sensors include a first distance sensor and a second distance sensor disposed in a first direction orthogonal to an axial direction of the dispenser. The second distance sensor is disposed in a position further apart from the dispenser than the first distance sensor. The control section executes, on the robot, a first instruction for causing the robot to execute the discharge of the discharge object by the dispenser when a distance acquired by the first distance sensor is a distance in a predetermined range and a distance acquired by the second distance sensor is a distance larger than the distance in the predetermined range.

DESCRIPTION OF EXEMPLARY EMBODIMENTS

A. First Embodiment

Figure 1:
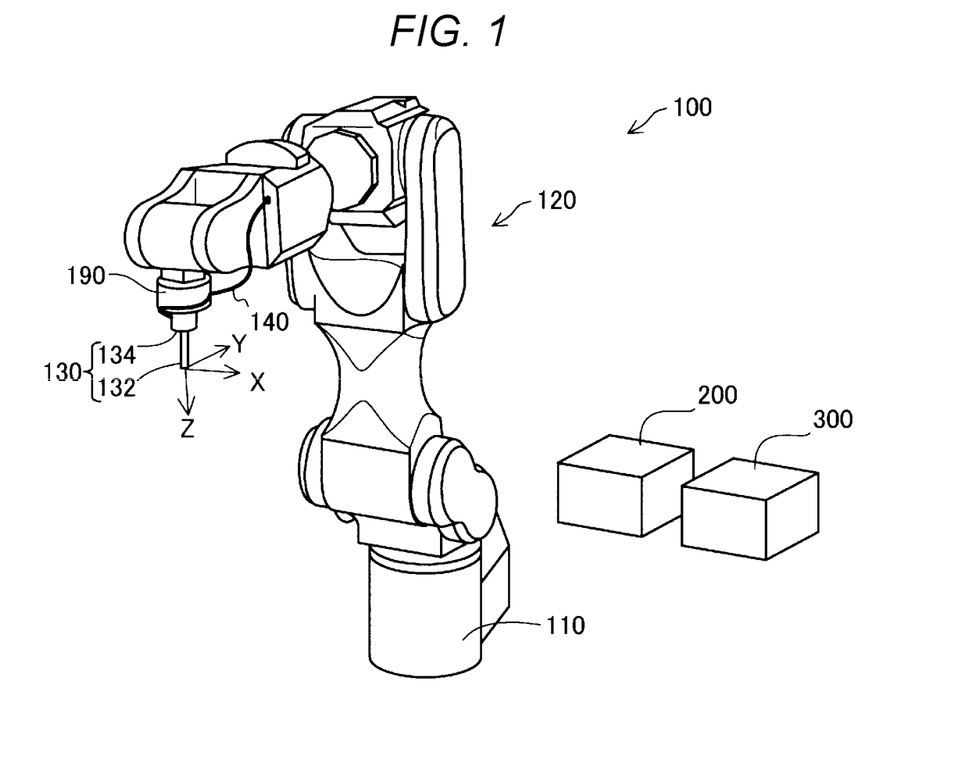
FIG. 1 is a perspective view showing an example of a robot system.
Figure 2:
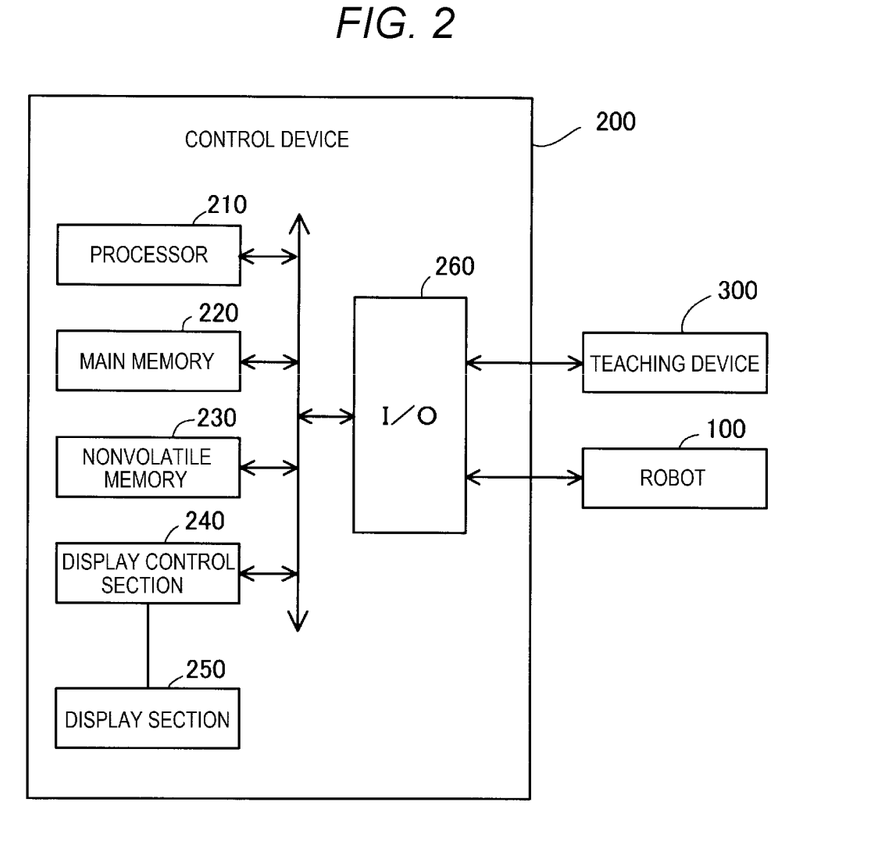
FIG. 2 is a block diagram showing functions of a robot and a control device.

FIG. 1 is a perspective view showing an example of a robot system according to a first embodiment. FIG. 2 is a block diagram showing functions of a robot 100 and a control device 200. In the following explanation, the configuration of the robot system according to this embodiment is explained with reference to FIGS. 1 and 2. The robot system includes the robot 100, the control device 200, and a teaching device 300. The control device 200 is communicably connected to the robot 100 and the teaching device 300 via a cable or by radio.

The robot 100 executes work according to teaching data created in advance. The robot 100 is capable of adjusting a motion according to detection values acquired from sensors included in the robot system. As shown in FIG. 1, the robot 100 includes a base 110 and a robot arm 120. In the following explanation, the robot arm 120 is simply described as arm 120 as well.

The arm 120 includes a plurality of joints. A force sensor 190 is set at the distal end of the arm 120. An end effector 130 is attached to the distal end side of the force sensor 190. In the example shown in FIG. 1, for convenience of illustration, the end effector 130 is drawn in a simple shape. The number of axes of the arm 120 is six. Therefore, the arm 120 can move the end effector 130 to any position according to an instruction from the control device 200.

In this embodiment, the end effector 130 includes a needle 132 functioning as a dispenser that discharges a discharge object and a plurality of distance sensors 134 that detect a distance from a discharge surface S onto which the discharge object is discharged from the needle 132. The end effector 130 is electrically coupled to the arm 120 via a wire 140. The wire 140 is attached in a state in which the wire 140 can be visually seen from the outside of the robot 100.

The force sensor 190 is a six-axis force sensor that measures an external force applied to the end effector 130. The force sensor 190 is not limited to the six-axis force sensor and may be, for example, a force sensor having five or less axes. In this embodiment, the force sensor 190 is provided at the distal end of the arm 120. However, the force sensor 190 is not limited to this. The force sensor 190 may be provided in, for example, any one of joints of the arm 120.

As shown in FIG. 2, the control device 200 includes a processor 210, a main memory 220, a nonvolatile memory 230, a display control section 240, a display section 250, and an I/O interface 260. These sections are coupled via a bus. The processor 210 is, for example, a microprocessor or a processor circuit and functions as a control section for controlling the operation of the robot 100. In the following explanation, the processor 210 is described as control section 210 as well. The control device 200 is coupled to the robot 100 and the teaching device 300 via the I/O interface 260. The control device 200 may be housed on the inside of the robot 100. In this embodiment, the control device 200 can control the robot 100 using a tool coordinate system centering on the distal end of the end effector 130. A tool center point, which is the origin of the tool coordinate system, is the distal end center of the needle 132, which is a part of the end effector 130. A Z axis of the tool coordinate system is an axis extending in a direction along an opening direction of the needle 132. A +Z-axis direction, which is a plus direction in a Z-axis direction, is a discharging direction of the discharge object by the needle 132. An X axis and a Y axis are orthogonal to each other and extend in a direction orthogonal to the Z axis.

The control device 200 moves the arm 120 by driving an actuator according to teaching data stored in the main memory 220 and values output from the distance sensors 134. Computer programs stored in the nonvolatile memory 230 in advance are used to realize various functions of the control device 200.

The configuration of the control device 200 can be changed as appropriate and is not limited to the configuration shown in FIG. 2. For example, the processor 210 and the main memory 220 may be provided in another device capable of communicating with the control device 200. In this case, the control device 200 and the other device function as a control device for the robot 100. The control device 200 may include a plurality of processors 210.

The teaching device 300 is used in creating a control program including teaching data for work of the robot 100. The teaching device 300 is called "teaching pendant" as well. A personal computer including an application program for teaching processing may be used instead of the teaching pendant. The teaching device 300 transmits the created teaching data to the control device 200. The transmitted teaching data is stored in the main memory 220 of the control device 200.

Figure 3:
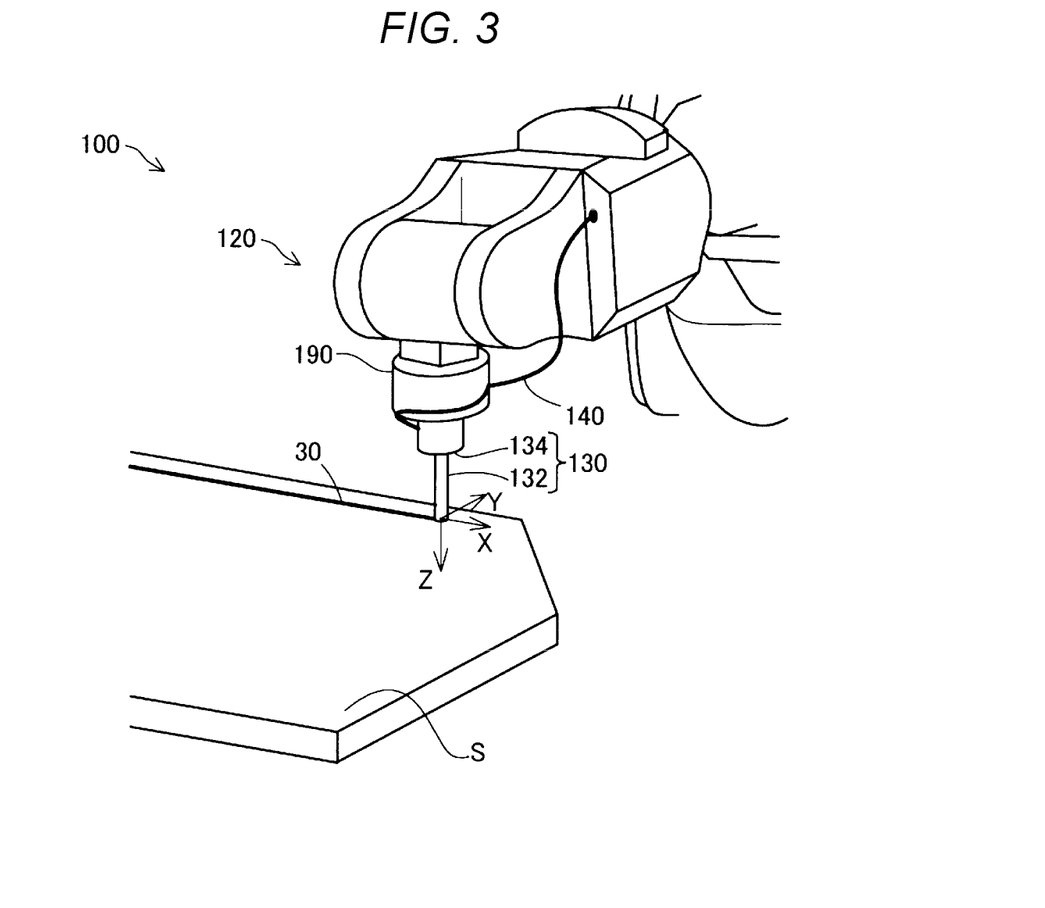
FIG. 3 is a schematic diagram showing a state of the robot at the time when the robot discharges a discharge object.

FIG. 3 is a schematic diagram showing a state of the robot 100 at the time when the robot 100 discharges a discharge object 30. In the following explanation, an overview of control content of the robot 100 executed by the control device 200 is explained with reference to FIG. 3.

The robot 100 applies an adhesive to a discharge surface S by discharging the adhesive from the needle 132 as the discharge object 30. The discharge surface S is, for example, a machined surface of various manufactured products including a case of a smartphone, a liquid crystal panel, and a camera module completed by an injection molding machine. The discharge object 30 is not limited to the adhesive. For example, the discharge object 30 only has to be a liquid substance, a jelly substance, or a gel substance having viscosity and can be changed as appropriate according to use of the robot 100. More specifically, for example, the discharge object 30 may be paint or resin used as a seal member, a cushioning material, or the like.

When the discharge object 30 is applied to the discharge surface S, the arm 120 is driven according to control from the control device 200 such that the needle 132 moves from one predetermined teaching point toward the other predetermined teaching point. When the discharge object 30 is applied to the discharge surface S, the control device 200 executes various kinds of control. For example, the control device 200 executes position correction control, height correction control, and angle correction control. The position correction control is control for preventing the needle 132 from moving to a range deviating from the discharge surface S. The height correction control is control for setting the distance between the needle 132 and the discharge surface S to a preset distance. The angle correction control is control for setting the angle between the needle 132 and the discharge surface S to a preset angle. Values output from the distance sensors 134 are used for the position correction control, the height correction control, and the angle correction control. The control device 200 measures an amount of the discharge object 30 discharged from the needle 132 using detection values of the distance sensors 134.

Figure 4:
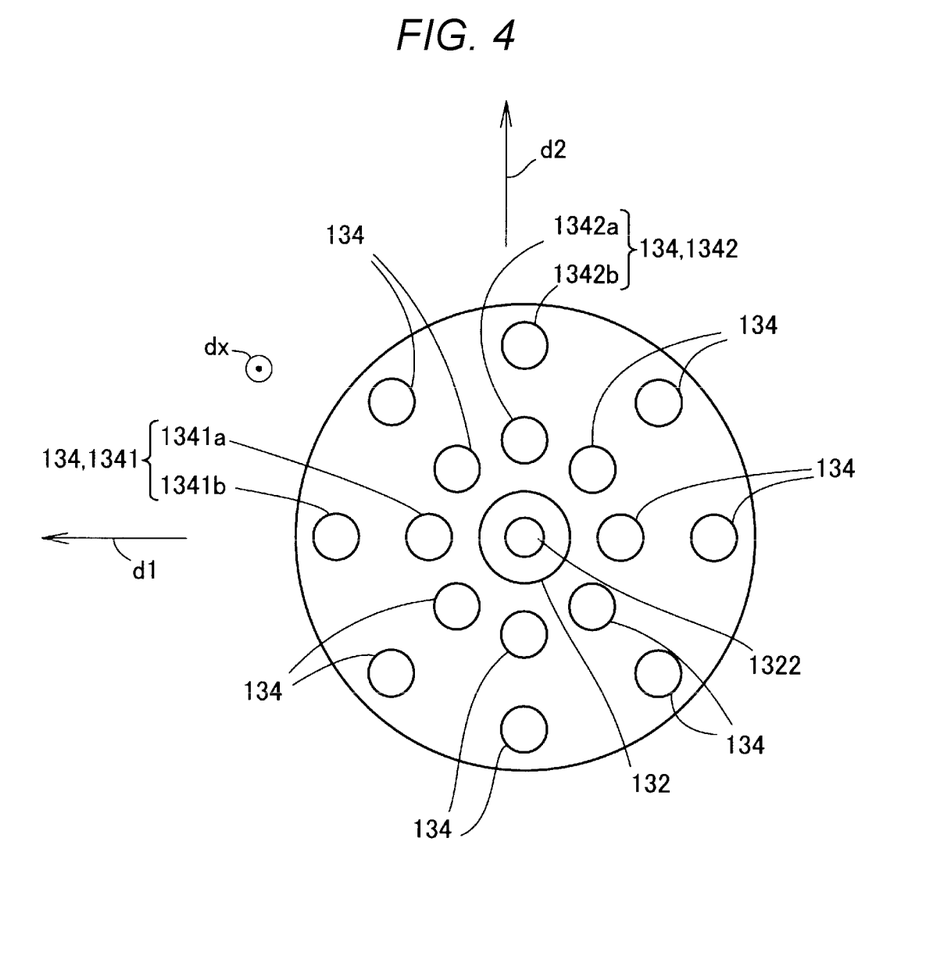
FIG. 4 is a schematic diagram showing a positional relation between a needle and distance sensors.

FIG. 4 is a schematic diagram showing a positional relation between the needle 132 and the distance sensors 134. In FIG. 4, a front view of the end effector 130 viewed from the distal end side of the needle 132 is schematically shown. In the following explanation, the positions of the needle 132 and the distance sensors 134 are explained using a positional relation of the needle 132 and the distance sensors 134 viewed from the distal end side of the needle 132.

In this embodiment, the end effector 130 includes sixteen distance sensors 134 disposed around the needle 132. In the following explanation, for convenience of explanation, a part of the sixteen distance sensors 134 are sometimes numbered and described as first distance sensors 1341a and the like in order to be distinguished from the other distance sensors 134.

Two distance sensors 134 among the sixteen distance sensors 134 are disposed in a direction perpendicular to an axial direction dx of the needle 132. A distance between the two distance sensors 134 forming a pair disposed in each direction perpendicular to the axial direction dx is designed to be a predetermined distance. The distance sensor 134 farther from the needle 132 of the two distance sensors 134 forming a pair is designed to be located at a predetermined distance from the needle 132. Therefore, eight distance sensors 134 among the sixteen distance sensors 134 are disposed on each of two concentric circles centering on the needle 132. Eight pairs of distance sensors 134 among the sixteen distance sensors 134 are disposed around the needle 132 at equal angle intervals. In this embodiment, the angle intervals of the disposition of the eight pairs of distance sensors 134 are 45°.

For example, two distance sensors 1341a and 1341b are disposed from the needle 132 toward a first direction d1. The distance sensor 134 close to the needle 132 of the two distance sensors 1341a and 1341b disposed toward the first direction d1 is referred to as first distance sensor 1341a. The distance sensor 134 far from the needle 132 of the two distance sensors 1341a and 1341b is referred to as second distance sensor 1341b. For example, two distance sensors 1342a and 1342b are disposed from the needle 132 toward a second direction d2. The distance sensor 134 close to the needle 132 of the two distance sensors 1342a and 1342b disposed toward the second direction d2 is referred to as third distance sensor 1342a. The distance sensor 134 far from the needle 132 of the two distance sensors 1342a and 1342b is referred to as fourth distance sensor 1342b. The second direction d2 is a direction orthogonal to both of the axial direction dx and the first direction d1.

An ultrasonic sensor is used as the distance sensor 134. When the ultrasonic sensor is used as the distance sensor 134, processing of a signal is easy compared with, for example, when an optical sensor is used. A time from transmission of ultrasound forming a signal to reception of the ultrasound is long in the ultrasonic sensor compared with, for example, the optical sensor. Therefore, necessary response speed and necessary time resolution are small when the ultrasonic sensor is used compared with when the optical sensor is used. In this embodiment, the ultrasonic sensor is an ultrasonic array in which a plurality of ultrasound generating elements are arrayed. The ultrasonic array used as the distance sensor 134 functions as a transmitter that irradiates ultrasound, which is generated according to deflective deformation of the ultrasound generating elements, onto a measurement target. The ultrasonic array functions as a detector that can acquire the ultrasound reflected on the measurement target. Phase difference shift driving of the ultrasonic array is possible. The phase difference shift driving means a driving method for shifting driving timings of the ultrasound generating elements to thereby adjust phase differences among ultrasounds generated from the ultrasound generating elements. Consequently, the ultrasonic array is capable of optionally changing transmitting directions of the ultrasounds using interference among the ultrasounds that occur according to the phase differences. Therefore, when the ultrasonic array capable of performing the phase difference shift driving is used as the distance sensor 134, since it is unnecessary to separately provide a mechanism for adjusting the transmitting directions, it is easy to reduce the size of the distance sensor 134. In this case, flexibility in design is high compared with when other configurations are used as the distance sensor 134. In this embodiment, a piezoelectric element is used as the ultrasound generating element. For example, lead zirconate titanate (PZT), lead titanate (PbTiO3), lead zirconate (PbZrO3), or lanthanum titanate ((Pb, La) TiO3) formed in a film shape can be used in the piezoelectric element. In this embodiment, PZT formed in a film shape is used in the piezoelectric element. A bulk ultrasonic sensor including a bulk ultrasonic element may be used as the ultrasonic sensor.

When a plurality of distance sensors 134 are disposed, it is necessary to reduce overlap of ultrasounds transmitted from the plurality of distance sensors 134. Therefore, it is necessary to determine the disposition and the number of the distance sensors 134 considering points explained below. A degree of the overlap of the ultrasounds fluctuates according to, for example, a level of directivity of the ultrasounds transmitted from the distance sensors 134. Specifically, when the directivity is high, the overlap of the ultrasounds is small. A transmitting direction at the time when phase scanning of the ultrasound is executed can be further sharpened by increasing the number of ultrasound generating elements included in the ultrasonic sensor array forming the distance sensor 134. Therefore, the directivity of the ultrasounds can be increased. The directivity of the ultrasounds can also be changed by, for example, attaching an acoustic lens. When the distance between the distance sensor 134 and the discharge surface S set as a target of measurement is large, since the ultrasounds spread, the overlap of the ultrasounds increases. The distances among the distance sensors also affect the degree of the overlap of the ultrasounds.

Figure 5:
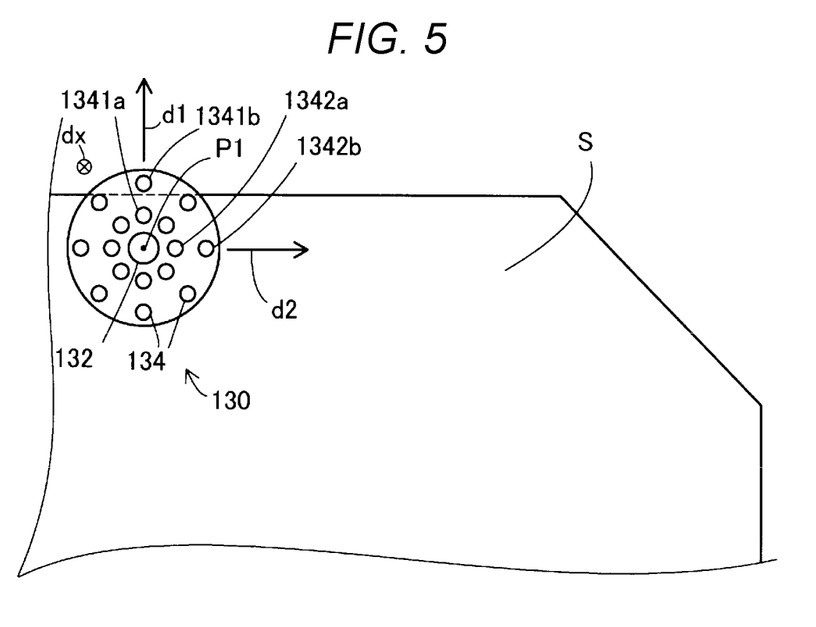
FIG. 5 is a first schematic diagram showing a state in which the needle discharges the discharge object along an edge of a discharge surface.
Figure 6:
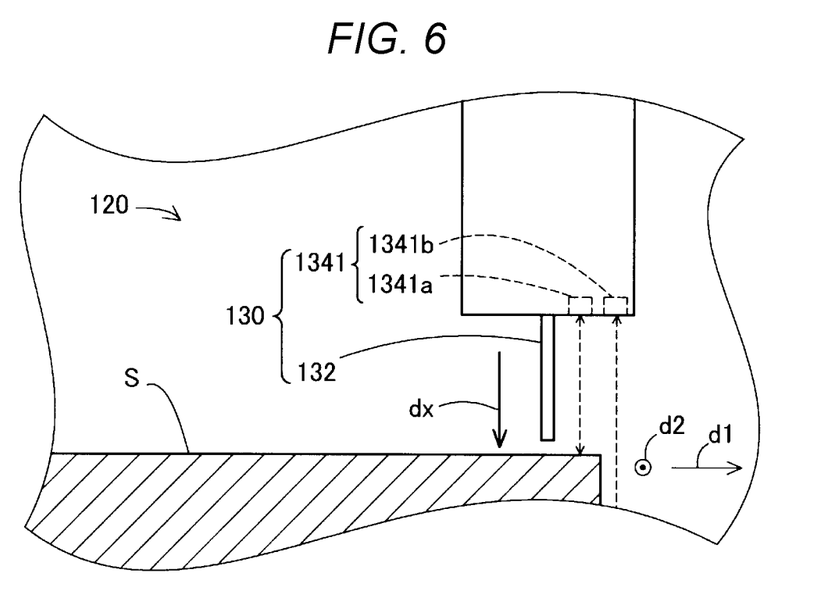
FIG. 6 is a schematic diagram showing a state of an end effector shown in FIG. 5.
Figure 7:
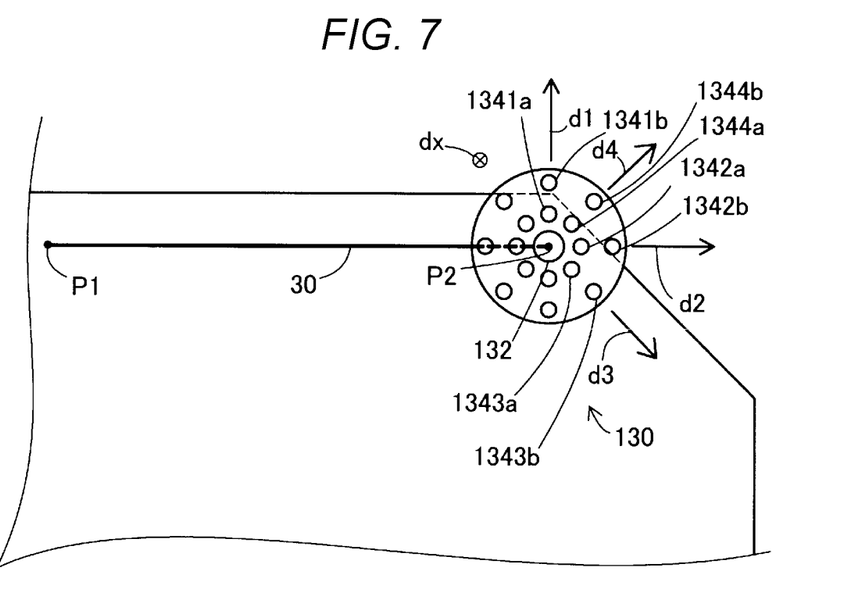
FIG. 7 is a second schematic diagram showing a state in which the needle discharges the discharge object onto the discharge surface.
Figure 8:
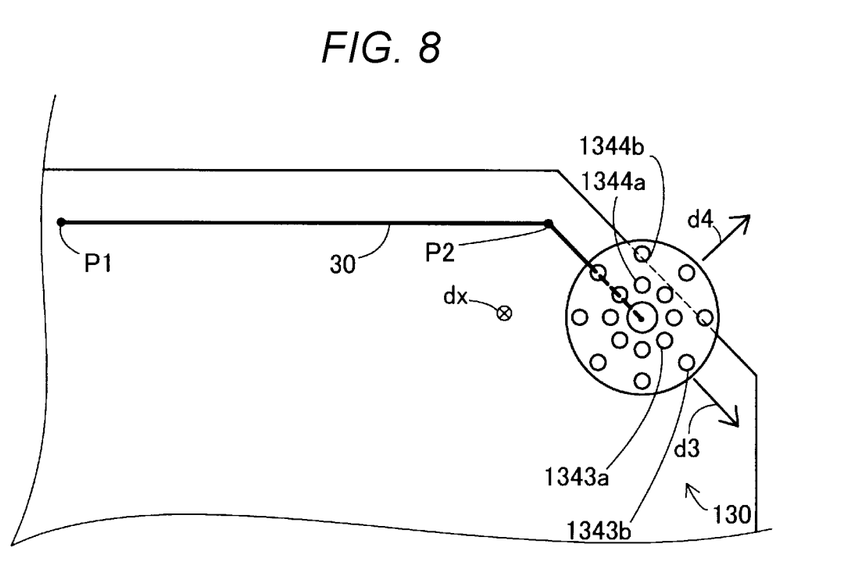
FIG. 8 is a third schematic diagram showing a state in which the needle discharges the discharge object onto the discharge surface.

FIG. 5 is a first schematic diagram showing a state in which the needle 132 discharges the discharge object along an edge of the discharge surface S. FIG. 6 is a schematic diagram showing a state of the end effector 130 shown in FIG. 5. FIG. 7 is a second schematic diagram showing a state in which the needle 132 discharges the discharge object onto the discharge surface S. FIG. 8 is a third schematic diagram showing a state in which the needle 132 discharges the discharge object onto the discharge surface S. Processing explained below is executed when the needle 132 moves among teaching points.

The control section 210 moves the needle 132 to the edge of the discharge surface S, for example, a point P1 shown in FIG. 5. When moving the needle 132 to the edge of the discharge surface S, the control section 210 may drive the arm 120 according to, for example, teaching data. The control section 210 may drive the arm 120 according to an input from a user of the robot system.

The control section 210 causes the robot 100 to execute discharge after the needle 132 reaches the edge of the discharge surface S. Specifically, the control section 210 determines, using distance information acquired from two distance sensors 134 forming a pair among the plurality of distance sensors 134 included in the end effector 130, whether the discharge from the needle 132 is executed. The control section 210 causes the robot 100 to execute discharge of the discharge object 30 when a first condition including the following two requirements is satisfied. A first requirement is that a distance acquired from the distance sensor 134 far from the needle 132 of the two distance sensors 134 is larger than a distance L in a predetermined range. A second requirement is that a distance acquired from the distance sensor 134 close from the needle 132 of the two distance sensors 134 is the distance L in the predetermined range.

In the state shown in FIG. 6, as a distance acquired by the first distance sensor 1341a, the distance to the discharge surface S is acquired. In this case, the distance acquired from the first distance sensor 1341a is the distance L in the predetermined range. On the other hand, as a distance acquired by the second distance sensor 1341b, the distance to a position deviating from the discharge surface S is acquired. In this case, the distance acquired from the second distance sensor 1341b is a distance larger than the distance L in the predetermined range. In the states shown in FIGS. 5 and 6, since the two requirements are satisfied, the control section 210 instructs the robot 100 to discharge the discharge object 30. In the following explanation, this instruction is described as first instruction as well. The distance L in the predetermined range is the distance between the discharge surface S and the distance sensor 134 assumed when the discharge onto the discharge surface S is executed. The discharge surface S includes a structure other than a plane, for example, an uneven surface.

When instructing the discharge, the control section 210 determines whether to move the needle 132. In this case, the control section 210 uses distances acquired by the two distance sensors 1342a and 1342b disposed in the second direction d2 orthogonal to the first direction d1, which is the direction in which the two distance sensors 1341a and 1341b are disposed used in the first condition. When a second condition is satisfied, an edge is absent on the second direction d2 side. The second condition is that distances acquired from a third distance sensor 1342a and a fourth distance sensor 1342b disposed in the second direction d2 are the distance L in the predetermined range. Therefore, when the second condition is satisfied, the control section 210 executes a second instruction for moving the needle 132 in the second direction d2. When the second condition is not satisfied, the control section 210 may select a direction in which the needle 132 is movable from directions other than the second direction d2. In this case, the control section 210 may change the position and the angle of the arm 120 to change a positional relation between the discharge surface S and the distance sensors 134.

When the needle 132 is moved in the second direction d2 according to the second instruction, the needle 132 is desirably moved in a state in which the first condition is satisfied. The discharge of the discharge object 30 from the needle 132 conforming to the first instruction is stopped when the first condition is not satisfied. Consequently, the discharge object 30 is prevented from being discharged to a region other than the edge. In this case, the control section 210 may adjust the position and the angle of the arm 120 to satisfy the first condition again.

When the edge of the discharge surface S is present in the second direction d2 after the needle 132 is moved in the second direction d2, the control section 210 instructs the robot 100 to stop the movement of the needle 132 in the second direction d2. As shown in FIG. 7, when the needle 132 reaches a second position P2, the fourth distance sensor 1342b moves to the outside of the discharge surface S. When a third condition that the distance acquired from the fourth distance sensor 1342b far from the needle 132 of the two distance sensors 1342a and 1342b used in the second condition is larger than the distance L in the predetermined range is satisfied, the control section 210 instructs the robot 100 to stop the movement of the needle 132 in the second direction d2. This instruction is referred to as third instruction as well. In this case, the control section 210 also instructs the robot 100 to stop the discharge. Consequently, it is possible to prevent the needle 132 from discharging the discharge object 30 to the outer side of the discharge surface S.

When the movement of the needle 132 is stopped according to the third instruction, the control section 210 determines whether to move the needle 132 in a direction different from the second direction d2. As shown in FIG. 7, a fourth condition that a distance acquired by a fifth distance sensor 1343a disposed in a third direction d3, which is a direction different from the second direction d2, is larger than the distance L in the predetermined range is satisfied. In this case, the control section 210 executes a fourth instruction for moving the needle 132 in the third direction d3.

When the movement of the needle 132 is stopped according to the third instruction, the control section 210 determines whether to move the needle 132 in a direction different from the second direction d2. As shown in FIG. 7, the fourth condition that a distance acquired by the fifth distance sensor 1343a disposed in the third direction d3, which is the direction different from the second direction d2, is larger than the distance L in the predetermined range is satisfied. In this case, the control section 210 executes the fourth instruction for moving the needle 132 in the third direction d3. When the fourth condition is not satisfied, the control section 210 may select a direction in which the needle 132 is movable from directions other than the second direction d2. In this case, the control section 210 may change the position and the angle of the arm 120 to change the positional relation between the discharge surface S and the distance sensors 134.

When a fifth condition is satisfied in addition to the fourth condition, the control section 210 executes, on the robot 100, a fifth instruction for moving the needle 132 in the third direction d3 and causing the robot 100 to execute the discharge of the discharge object 30. The fifth condition is that a distance acquired by a sixth distance sensor 1344b disposed in a fourth direction d4 orthogonal to the third direction d3 is larger than the distance L in the predetermined range. In executing the fifth instruction, the control section 210 may control the position and the angle of the arm 120 to set a distance acquired by a seventh distance sensor 1344a disposed between the sixth distance sensor 1344b and the needle 132 to the distance L in the predetermined range. When the series of processing is executed, as shown in FIG. 8, the discharge object 30 can be discharged along the edge of the discharge surface S.

As an example, the first direction d1 shown in FIG. 5 is a direction along the edge of the discharge surface S. However, the first direction d1 does not need to be the direction along the edge of the discharge surface S. Even when the first direction d1 and the direction in which the edge of the discharge surface S extends cross, the position of the discharge by the needle 132 is corrected by the series of processing.

When executing the series of processing, the control section 210 executes angle correction processing for the needle 132. For the angle correction processing, three or more distance sensors, distances acquired by which are the distance L in the predetermined range, among the plurality of distance sensors 134 are used. For example, the control section 210 sets the distances acquired by the three or more distance sensors 134 to a predetermined relation to thereby control an angle formed by the axial direction dx of the needle 132 and the discharge surface S, onto which the discharge object 30 is discharged, to be a predetermined angle. Specifically, for example, when the arm 120 is controlled to set the distances acquired by the three or more distance sensors 134 to be the same, the needle 132 and the discharge surface S are perpendicular. The three or more distance sensors 134 used for the angle correction processing desirably have the same degree of distances from the needle 132.

When executing the series of processing, the control section 210 executes calculation of a discharge amount of the discharge object 30. In the calculation of the discharge amount, the control section 210 uses at least one of the distance sensor 134 located in the rear in the moving direction of the needle 132 and the distance sensor 134 located in the front in the moving direction of the needle 132. The control section 210 acquires the discharge amount according to a difference between the distance to the discharge surface S acquired by the distance sensor 134 on the front side and the distance to the discharge surface S acquired by the distance sensor 134 on the rear side. The distance to the discharge surface S acquired by the distance sensor 134 on the front side indicates the distance to the discharge surface S before the discharge object 30 is discharged. On the other hand, the distance to the discharge surface S acquired by the distance sensor 134 on the rear side indicates the distance to the discharge surface S after the discharge object 30 is discharged.

According to the first embodiment explained above, the control section 210 causes the robot 100 to execute the discharge when the edge of the discharge surface S is present between a position where a distance is measured by the first distance sensor 1341a and a position where a distance is measured by the second distance sensor 1341b. Therefore, when the discharge object 30 is discharged along the edge of the discharge surface S, likelihood that the discharge object 30 is discharged to a position deviating from the edge of the discharge surface S is reduced even if there is fluctuation in the shape of the discharge surface S.

Figure 9:
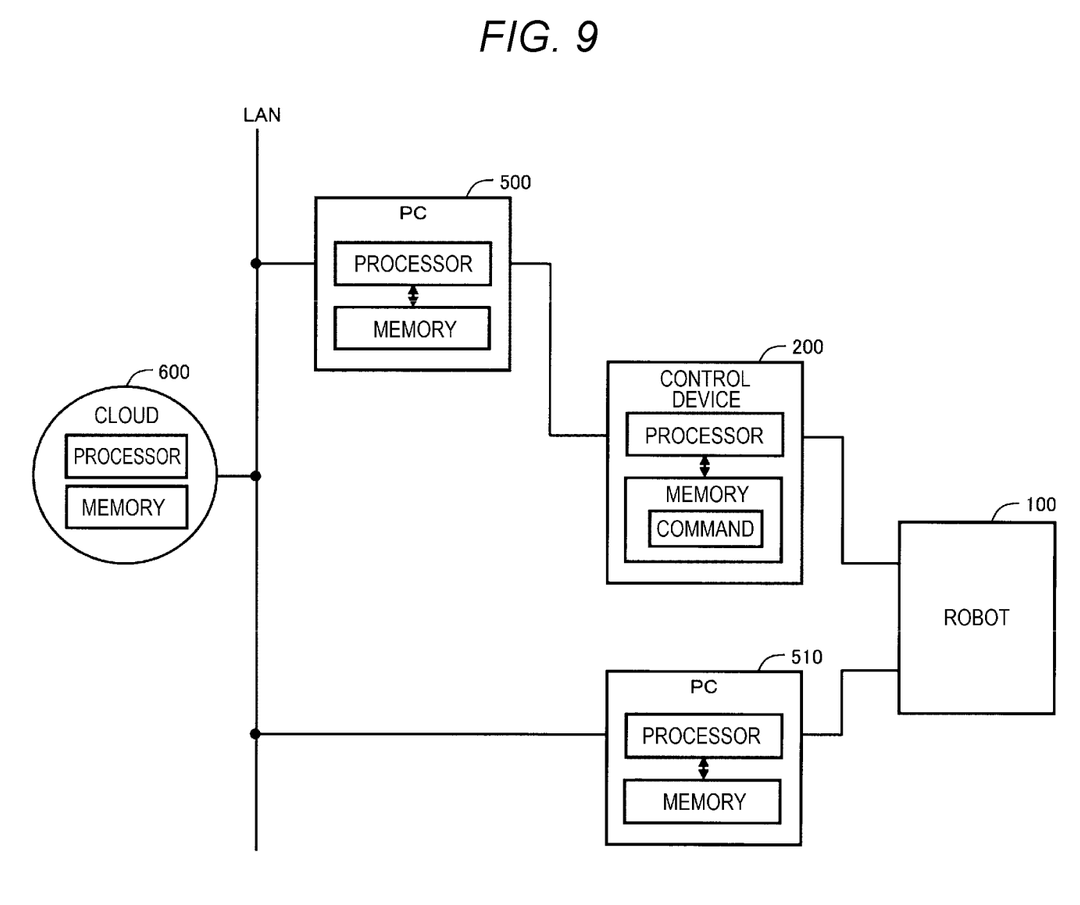
FIG. 9 is a conceptual diagram showing an example in which the control device for the robot is configured by a plurality of processors.

B. Second Embodiment (1) FIG. 9 is a conceptual diagram showing an example in which a control device for a robot is configured by a plurality of processors. In this example, besides the robot 100 and the control device 200 for the robot 100, personal computers 500 and 510 and a cloud service 600 provided via a network environment such as a LAN are drawn in FIG. 9. The personal computers 500 and 510 respectively include processors and memories. A processor and a memory are usable in the cloud service 600 as well. The processors execute computer-executable commands. It is possible to realize a robot control device including the control device 200 and the teaching device 300 using a part or all of these plurality of processors. A storing section that stores various kinds of information can also be realized using a part or all of the plurality of memories.

Figure 10:
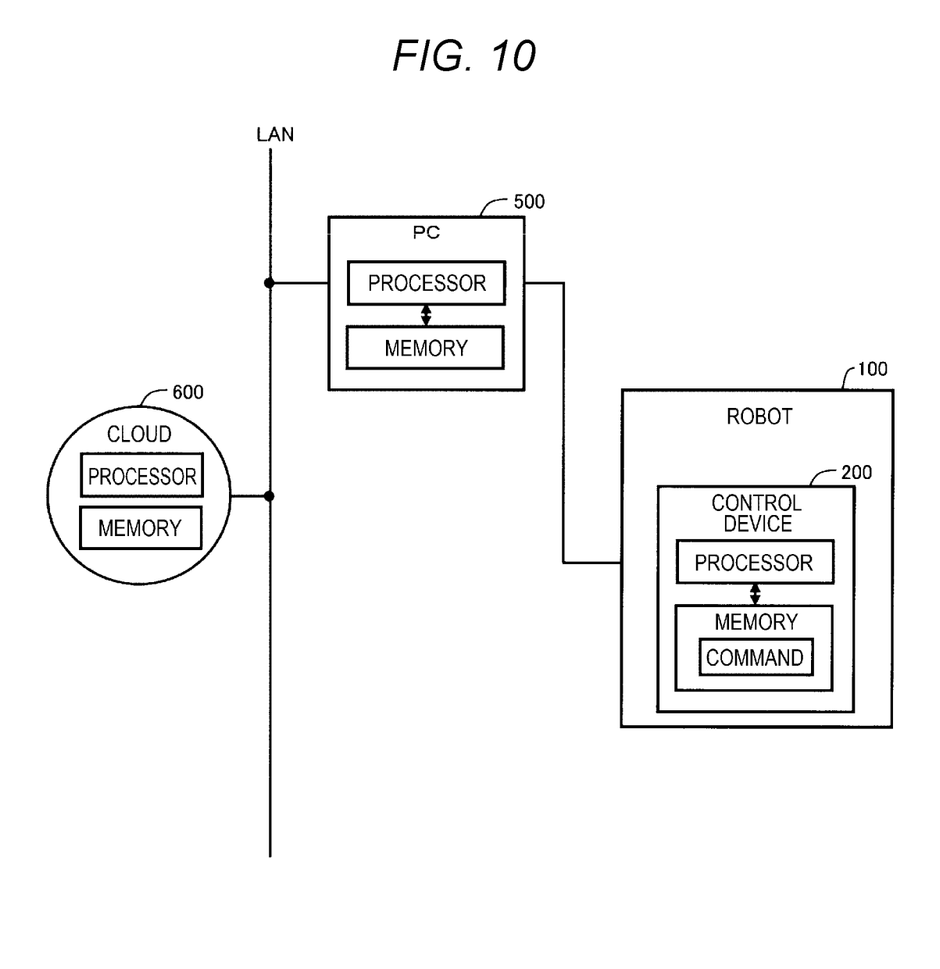
FIG. 10 is a conceptual diagram showing another example in which the control device for the robot is configured by a plurality of processors.

(2) FIG. 10 is a conceptual diagram showing another example in which a control device for a robot is configured by a plurality of processors. This example is different from the example shown in FIG. 9 in that the control device 200 for the robot 100 is housed in the robot 100. In this example, it is also possible to realize a robot control device including the control device 200 and the teaching device 300 using apart or all of the plurality of processors. A storing section that stores various kinds of information can also be realized using a part or all of a plurality of memories.

C. Other Embodiments

C1. First Another Embodiment

The control section 210 described in the embodiments explained above may execute only processing up to any processing in the processing after the first instruction in the series of processing from the first instruction to the fifth instruction. Even in this case, since the control device 200 executes at least the first instruction, when the discharge object 30 is discharged along the edge of the discharge surface S, likelihood that the discharge object 30 is discharged to a position deviating from the edge of the discharge surface S is reduced even if there is fluctuation in the shape of the discharge surface S.

C2. Second Another Embodiment

In the embodiments explained above, the sixteen distance sensors 134 are disposed on the two concentric circles centering on the needle 132. However, the distance sensors 134 may be disposed differently in the arm 120. Seventeen or more distance sensors 134 may be included in the arm 120. Fifteen or less distance sensors 134 may be included in the arm 120. The plurality of distance sensors 134 may be disposed on three or more concentric circles centering on the needle 132. The plurality of distance sensors 134 do not need to be always disposed on a plurality of concentric circles centering on the needle 132.

For example, a minimum number of the distance sensors 134 for the robot 100 to execute operation corresponding to the first instruction is two. In this case, two distance sensors 134 only have to be disposed on a straight line extending in one direction from the needle 132.

C3. Third Another Embodiment

In the embodiments explained above, in the two distance sensors 134 forming a pair, the distance between the two distance sensors 134, for example, the first distance sensor 1341a and the second distance sensor 1341b cannot be changed. However, in the two distance sensors 134 forming a pair, the distance between the two distance sensors 134 may be changeable. In this case, the robot 100 may include a mechanism for changing the positions of the distance sensors 134. For example, the robot 100 may include a mechanism for changing the position of the distance sensor 134 disposed on a far side from the needle 132 of the distance sensors 134 forming a pair. In this case, it is possible to change the position of the distance sensor 134 disposed on the far side from the needle 132 according to a positional relation between a position to which the discharge object 30 is desired to be discharged and the edge of the discharge surface S.

C4. Fourth Another Embodiment

In the embodiments explained above, the positional relation between the discharge surface S and the distance sensors 134 is not limited. However, the positional relation between the discharge surface S and the distance sensor 134 may be adjusted to dispose the discharge surface S and the distance sensors 134 at a predetermined distance. For example, the distance sensors 134 may be disposed on the distal end side of the needle 132 to make it possible to reduce the distance between the distance sensor 134 and the discharge surface S. In this case, it is possible to reduce the diameters of irradiation spots formed on the discharge surface S by ultrasounds transmitted from the distance sensors 134. Consequently, likelihood that ultrasounds transmitted from the plurality of distance sensors 134 overlap is reduced. Therefore, it is easy to disposed the distance sensors 134 at higher density around the needle 132.

C5. Fifth Another Embodiment

In the embodiments explained above, the distance sensors 134 are the ultrasonic sensors. However, the distance sensors 134 are not limited to the ultrasonic sensors. For example, the distance sensors 134 may be laser sensors including laser beam sources and optical sensors. In this case, the laser sensors may be used to acquire a flying time required until a pulse laser beam is reflected from an object. In this case, the control section 210 may acquire a distance by performing a flying time analysis for calculating a distance to the object based on the flying time.

C6. Sixth Another Embodiment

In the embodiments explained above, the force sensor 190 may not be provided. When the force sensor 190 is not provided, the control device 200 may supplement the function of the force sensor 190 by calculating a driving amount of the actuator included in the robot 100 based on content of an instruction given to the robot 100. When the robot system further includes an image acquiring device such as a camera, the control device 200 may acquire a posture and the like of the robot 100 based on image data acquired from the image acquiring device.

C7. Seventh Another Embodiment

In the embodiments explained above, in the fourth instruction executed when the fourth condition is satisfied, the third direction d3, which is the moving direction of the needle 132, is limited to the direction crossing the second direction d2. However, the third direction d3 is not limited to this. For example, the third direction d3 may be a direction opposite to the second direction d2. In this case, when the edge of the discharge surface S is present on the second direction d2 side, the needle 132 turns back a path on which the needle 132 has moved.

C8. Eighth Another Embodiment

In the embodiments explained above, the robot 100 is the six-axis robot. However, the robot 100 is not limited to the six-axis robot. The number of axes of the robot 100 may be seven or more or may be five or less. Specifically, for example, the robot 100 may be a SCARA robot, which is a one-axis robot.

C9. Ninth Another Embodiment

In the embodiments explained above, the end effector 130 included in the robot 100 includes the needle 132 as the dispenser that discharges the discharge object 30. However, the dispenser is not limited to the needle 132. For example, the robot 100 may include a dispenser and a jet dispenser.

C10. Tenth Another Embodiment

In the embodiments explained above, the control section 210 executes the angle correction processing. However, the control section 210 is not limited to this. For example, the control section 210 may not execute the height correction processing. The control section 210 acquires the discharge amount of the discharge object 30. However, the control section 210 is not limited to this. For example, the control section 210 may not acquire the discharge amount.

The first to tenth other embodiments explained above achieve the same effects in that the first to tenth other embodiments have the same configuration as the embodiments explained above.

The present disclosure is not limited to the embodiments explained above and can be realized in various configurations without departing from the spirit of the present disclosure. For example, the technical features in the embodiments corresponding to the technical features in the aspects described in the summary can be substituted or combined as appropriate in order to solve a part or all of the problems described above or achieve a part or all of the effects described above. Unless the technical features are explained as essential technical features in this specification, the technical features can be deleted as appropriate.

(1) According to an aspect of the present disclosure, there is provided a control device that controls a robot including a robot arm, a dispenser provided at a distal end of the robot arm and configured to discharge a discharge object, and a plurality of distance sensors configured to detect distances to a target in a direction in which the discharge object is discharged. The control device includes a control section configured to control a motion of the robot arm using values detected by the distance sensors. The plurality of distance sensors include a first distance sensor and a second distance sensor. The first distance sensor is disposed between the dispenser and the second distance sensor. The second distance sensor is disposed along a first direction orthogonal to an axis of the dispenser and extending from the axis of the dispenser toward the first distance sensor. The dispenser discharges the discharge object when a first condition that a first value detected by the first distance sensor is included in a predetermined range and a second value detected by the second distance sensor exceeds the range is satisfied.

With the control device according to this aspect, the control section causes the robot to execute the discharge when an edge of a discharge target is present between a position where the distance is measured by the first distance sensor and a position where the distance is measured by the second distance sensor. Therefore, when the discharge object is discharged along the edge of the discharge target, likelihood that the discharge object is discharged to a position deviating from the edge of the discharge target is reduced even if there is fluctuation in the shape of the discharge target. The axis of the dispenser is an axis extending in a direction along a discharging direction of the discharge object in the dispenser. The values detected by the distance sensors are, for example, signal values output from the distance sensors. For example, the values detected by the distance sensors may be distance information acquired according to the signal values output from the distance sensors.

(2) In the aspect, the plurality of distance sensors may further include a third distance sensor and a fourth distance sensor. The third distance sensor may be disposed between the dispenser and the fourth distance sensor. The fourth distance sensor may be disposed along a second direction orthogonal to the axis of the dispenser and the first direction and extending from the axis of the dispenser toward the third distance sensor. The dispenser may discharge the discharge object and move in the second direction when a second condition that a third value detected by the third distance sensor and a fourth value detected by the fourth distance sensor are included in the range is satisfied in addition to the first condition.

With the control device according to this aspect, it is possible to move the dispenser in the second direction in which it is less likely that a discharge position of the dispenser moves to the outside of a discharge surface.

(3) In the aspect, when the dispenser is moving in the second direction, the dispenser may stop the movement in the second direction when a third condition that the fourth value exceeds the range is satisfied.

With the control device according to this aspect, it is possible to stop the movement of the dispenser in the second direction in which it is highly likely that the discharge position of the dispenser moves to the outside of the discharge surface.

(4) In the aspect, the plurality of distance sensors may further include a fifth distance sensor. The fifth distance sensor may be disposed such that a third direction extending from the axis of the dispenser toward the fifth distance sensor is orthogonal to the axis of the dispenser. The dispenser may move in the third direction when a fourth condition that a fifth value detected by the fifth distance sensor is included in the range is satisfied in addition to the third condition.

With the control device according to this aspect, it is possible to move the dispenser in the third direction in which it is less likely that the discharge position of the dispenser moves to the outside of the discharge surface.

(5) In the aspect, the plurality of distance sensors may further include a sixth distance sensor. The sixth distance sensor may be disposed such that a fourth direction extending from the axis of the dispenser toward the sixth distance sensor is orthogonal to the axis of the dispenser and the third direction. The control section may move the dispenser in the third direction and cause the dispenser to discharge the discharge object when a fifth condition that a sixth value detected by the sixth distance sensor exceeds the range is satisfied in addition to the fourth condition.

With the control device according to this aspect, it is also possible to cause the robot to execute the discharge when the dispenser is moved in the third direction.

(6) In the aspect, the control section may control an angle formed by the axis of the dispenser and a discharge surface, onto which the discharge object is discharged, to be a predetermined angle using three or more distance sensors, detected values of which are included in the range, among the plurality of distance sensors.

(7) In the aspect, the robot including ultrasonic sensors as the distance sensors may be controlled.

(8) In the aspect, the robot including laser sensors as the distance sensors may be controlled.

The present disclosure can also be realized in various forms other than the control device. For example, the present disclosure can be realized in forms of a robot controlled by the control device, a robot system including the control device and the robot, a control method for the robot, a control program for controlling the robot, and the like.

What is claimed is:

1. A control device that controls a robot including a robot arm, a dispenser provided at a distal end of the robot arm and configured to discharge a discharge object, and a plurality of distance sensors configured to detect distances to a target in a direction in which the discharge object is discharged, the control device comprising a control section configured to control a motion of the robot arm using values detected by the distance sensors, wherein the plurality of distance sensors include a first distance sensor and a second distance sensor, the first distance sensor is disposed between the dispenser and the second distance sensor, the second distance sensor is disposed along a first direction orthogonal to an axis of the dispenser and extending from the axis of the dispenser toward the first distance sensor, and the dispenser discharges the discharge object when a first condition that a first value detected by the first distance sensor is included in a predetermined range and a second value detected by the second distance sensor exceeds the range is satisfied.

2. The control device according to claim 1, wherein the plurality of distance sensors further include a third distance sensor and a fourth distance sensor, the third distance sensor is disposed between the dispenser and the fourth distance sensor, the fourth distance sensor is disposed along a second direction orthogonal to the axis of the dispenser and the first direction and extending from the axis of the dispenser toward the third distance sensor, and the dispenser discharges the discharge object and moves in the second direction when a second condition that a third value detected by the third distance sensor and a fourth value detected by the fourth distance sensor are included in the range is satisfied in addition to the first condition.

3. The control device according to claim 2, wherein, when the dispenser is moving in the second direction, the dispenser stops the movement in the second direction when a third condition that the fourth value exceeds the range is satisfied.

4. The control device according to claim 3, wherein the plurality of distance sensors further include a fifth distance sensor, the fifth distance sensor is disposed such that a third direction extending from the axis of the dispenser toward the fifth distance sensor is orthogonal to the axis of the dispenser, and the dispenser moves in the third direction when a fourth condition that a fifth value detected by the fifth distance sensor is included in the range is satisfied in addition to the third condition.

5. The control device according to claim 4, wherein the plurality of distance sensors further include a sixth distance sensor, the sixth distance sensor is disposed such that a fourth direction extending from the axis of the dispenser toward the sixth distance sensor is orthogonal to the axis of the dispenser and the third direction, and the control section moves the dispenser in the third direction and causes the dispenser to discharge the discharge object when a fifth condition that a sixth value detected by the sixth distance sensor exceeds the range is satisfied in addition to the fourth condition.

6. The control device according to claim 5, wherein the control section controls an angle formed by the axis of the dispenser and a discharge surface, onto which the discharge object is discharged, to be a predetermined angle using three or more distance sensors, detected values of which are included in the range, among the plurality of distance sensors.

7. The control device according to claim 1, wherein the control device controls the robot including ultrasonic sensors as the distance sensors.

8. The control device according to claim 1, wherein the control device controls the robot including laser sensors as the distance sensors.

9. A robot system comprising:

a robot including a robot arm, a dispenser provided at a distal end of the robot arm and configured to discharge a discharge object, and a plurality of distance sensors configured to detect distances to a target in a direction in which the discharge object is discharged; and the control device according to claim 1, the controlling device controlling the robot.

10. A robot controlled by a control device, the robot comprising:

a robot arm;

a dispenser provided at a distal end of the robot arm and configured to discharge a discharge object; and a plurality of distance sensors configured to detect distances to a target in a direction in which the discharge object is discharged, wherein the plurality of distance sensors include a first distance sensor and a second distance sensor, the first distance sensor is disposed between the dispenser and the second distance sensor, the second distance sensor is disposed along a first direction orthogonal to an axis of the dispenser and extending from the axis of the dispenser toward the first distance sensor, and the dispenser discharges the discharge object when a first condition that a first value detected by the first distance sensor is included in a predetermined range and a second value detected by the second distance sensor exceeds the range is satisfied.

* * * * *